(12) United States Patent
Jeon et al.

(10) Patent No.: US 12,362,435 B2
(45) Date of Patent: Jul. 15, 2025

(54) BATTERY MODULE COMPRISING MODULE BUS BAR, BATTERY PACK COMPRISING SAME, AND ELECTRONIC DEVICE

(71) Applicant: LG ENERGY SOLUTION, LTD., Seoul (KR)

(72) Inventors: Byeong-Jun Jeon, Daejeon (KR); Ji-Myong An, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 621 days.

(21) Appl. No.: 17/775,500

(22) PCT Filed: Apr. 6, 2021

(86) PCT No.: PCT/KR2021/004295
§ 371 (c)(1),
(2) Date: May 9, 2022

(87) PCT Pub. No.: WO2021/206426
PCT Pub. Date: Oct. 14, 2021

(65) Prior Publication Data
US 2022/0393310 A1    Dec. 8, 2022

(30) Foreign Application Priority Data
Apr. 9, 2020   (KR) .................... 10-2020-0043499

(51) Int. Cl.
*H01M 50/507* (2021.01)
*H01M 50/516* (2021.01)

(52) U.S. Cl.
CPC ....... *H01M 50/507* (2021.01); *H01M 50/516* (2021.01); *H01M 2200/103* (2013.01)

(58) Field of Classification Search
CPC ............. H01M 50/507; H01M 50/516; H01M 2200/103; H01M 50/503; H01M 50/517;
(Continued)

(56) References Cited

U.S. PATENT DOCUMENTS

2009/0297892 A1   12/2009   Ijaz et al.
2014/0255750 A1    9/2014   Jan et al.
(Continued)

FOREIGN PATENT DOCUMENTS

CN   102057519 A   5/2011
CN   105047497 A   11/2015
(Continued)

OTHER PUBLICATIONS

International Search Report (with partial translation) and Written Opinion dated Jul. 20, 2021, for corresponding International Patent Application No. PCT/KR2021/004295.
(Continued)

*Primary Examiner* — Lisa S Park
(74) *Attorney, Agent, or Firm* — Morgan, Lewis & Bockius LLP

(57) ABSTRACT

A battery module includes a plurality of cylindrical battery cells having electrode terminals; a module housing having an inner space to accommodate the cylindrical battery cells; and a module bus bar configured to electrically connect the cylindrical battery cells to each other. The module bus bar includes a first metal plate having a first body portion facing an outer surface of the module housing and a first contact portion configured to contact the electrode terminal; and a second metal plate having a second body portion stacked on an outer side of the first body portion of the first metal plate, a second contact portion configured to contact the electrode terminal, and a fuse portion configured to electrically connect the second contact portion and the second body portion
(Continued)

and be disconnected at a predetermined current or above. The second metal plate has a smaller thickness than the first metal plate.

9 Claims, 5 Drawing Sheets

(58) Field of Classification Search
CPC ............. H01M 50/583; H01M 50/213; H01M 50/502; H01M 50/581; H01M 2220/20; Y02E 60/10
See application file for complete search history.

(56) References Cited

U.S. PATENT DOCUMENTS

| | | |
|---|---|---|
| 2015/0243957 A1 | 8/2015 | Han et al. |
| 2015/0380713 A1 | 12/2015 | Kimura et al. |
| 2016/0315304 A1* | 10/2016 | Biskup ................ H01M 50/507 |
| 2016/0365562 A1 | 12/2016 | Sugiyama et al. |
| 2017/0077487 A1 | 3/2017 | Coakley |
| 2017/0214033 A1 | 7/2017 | Takano et al. |
| 2018/0190960 A1* | 7/2018 | Harris ................... H01M 50/20 |
| 2018/0358601 A1 | 12/2018 | Yanagihara et al. |
| 2019/0020011 A1 | 1/2019 | Yamanaka et al. |
| 2019/0214694 A1 | 7/2019 | Yang et al. |
| 2019/0237736 A1 | 8/2019 | Watanabe et al. |
| 2020/0343524 A1 | 10/2020 | Zeng |
| 2021/0036296 A1 | 2/2021 | Nobuhira et al. |
| 2021/0167467 A1 | 6/2021 | Yang et al. |

FOREIGN PATENT DOCUMENTS

| | | | |
|---|---|---|---|
| CN | 108289372 A | | 7/2018 |
| CN | 108666462 A | | 10/2018 |
| CN | 109004166 A | | 12/2018 |
| CN | 109256518 A | | 1/2019 |
| CN | 106252573 B | | 4/2019 |
| CN | 110098369 A | | 8/2019 |
| JP | 2014-154337 A | | 8/2014 |
| JP | 2014216189 | * | 11/2014 |
| JP | 2017-084603 A | | 5/2017 |
| JP | 2017-157509 A | | 9/2017 |
| JP | 2019-133900 A | | 8/2019 |
| KR | 10-2010-0134111 A | | 12/2010 |
| KR | 10-2015-0099193 A | | 8/2015 |
| KR | 20150132902 | * | 11/2015 |
| KR | 10-2016-0112379 A | | 9/2016 |
| KR | 10-2018-0115538 A | | 10/2018 |
| KR | 10-2019-0053106 A | | 5/2019 |
| KR | 10-2019-0053124 A | | 5/2019 |
| KR | 10-2019-0083533 A | | 7/2019 |
| KR | 10-2020-0034469 A | | 3/2020 |
| WO | 2016/072054 A1 | | 5/2016 |
| WO | 2017/169524 A1 | | 10/2017 |
| WO | 2018/179794 A1 | | 10/2018 |
| WO | 2019/187312 A1 | | 10/2019 |

OTHER PUBLICATIONS

Chinese Office Action issued in corresponding CN Application No. 202180006749.5 dated Sep. 29, 2023.
Japanese Office Action issued in corresponding JP Application No. 2022-525897 dated Jun. 12, 2023.
The extended European search report, dated Jul. 18, 2024, issued in corresponding EP Patent Application No. 21785020.5.
Office Action issued in corresponding Korean Patent Application No. 10-2021-0046797, dated Nov. 13, 2024. (Note: US 2017/0214033 A1 was previously cited).
Office Action issued in corresponding Taiwanese Patent Application No. 110105599, dated Oct. 21, 2024. (Note: US 2014/0255750 A1 was previously cited).

* cited by examiner

BATTERY MODULE COMPRISING MODULE BUS BAR, BATTERY PACK COMPRISING SAME, AND ELECTRONIC DEVICE

TECHNICAL FIELD

The present application claims priority to Korean Patent Application No. 10-2020-0043499 filed on Apr. 9, 2020 in the Republic of Korea, the disclosures of which are incorporated herein by reference.

The present disclosure relates to a battery module including a module bus bar, a battery pack including the battery module, and an electronic device, and more particularly, to a battery module including a module bus bar that may make an electrical disconnection rapidly when a high current flows and has excellent durability.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, hermetically containing the electrode assembly together with an electrolyte.

In addition, the lithium secondary battery may be classified depending on the exterior shape into a can-type secondary battery in which an electrode assembly is included in a metal can and a pouch-type secondary battery in which an electrode assembly is included in a pouch made of an aluminum laminate sheet.

Here, in case of the can-type secondary battery, the metal can in which the electrode assembly is included is sometimes manufactured in a cylindrical shape. The can-type secondary battery may be used to configure a battery module having a housing for accommodating a plurality of secondary batteries and a bus bar for electrically connecting the plurality of secondary batteries.

Recently, in some cases, the bus bar provided to the battery module uses a material having a somewhat high electrical resistance in order to increase the weldability of resistance welding with the electrode terminal.

In the prior art, if an electrical short circuit occurs between some secondary batteries among the plurality of secondary batteries included in the battery module so that a high current flows through the bus bar in some secondary batteries, a failure may occur at the product using the battery module. Thus, a battery management system (BMS) may be used to cut off the current. However, in order to cope with the high current when the BMS does not operate or operates erroneously, a fuse that is disconnected when a high current flows may be applied as a part of the bus bar.

At this time, the fuse of the bus bar is formed to have a smaller thickness or width than the other part of the bus bar in order to set the electrical resistance larger. However, the fuse of the bus bar having a smaller thickness or width has relatively weak mechanical stiffness. Thus, if an external shock or frequent vibrations are applied to the battery module, the fuse may be disconnected due to damage or cutting, which may deteriorate the durability of the battery module.

DISCLOSURE

Technical Problem

The present disclosure is designed to solve the problems of the related art, and therefore the present disclosure is directed to providing a battery module including a module bus bar, which may make an electrical disconnection rapidly when a high current flows and has excellent durability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
  a plurality of cylindrical battery cells having electrode terminals formed therein;
  a module housing having an inner space formed to accommodate the plurality of cylindrical battery cells; and
  a module bus bar configured to electrically connect the plurality of cylindrical battery cells to each other,
  wherein the module bus bar includes:
  a first metal plate having a first body portion located to face an outer surface of the module housing and a first contact portion configured to contact the electrode terminal; and
  a second metal plate having a second body portion stacked on an outer side of the first body portion of the first metal plate, a second contact portion configured to contact the electrode terminal, and a fuse portion configured to electrically connect the second contact portion and the second body portion to each other and be disconnected at a predetermined current or above, the second metal plate having a smaller thickness than the first metal plate.

Also, the second metal plate may include a reinforcing portion formed between the second contact portion and the fuse portion and having a greater width than the fuse portion.

Moreover, the module housing may include a connection opening perforated so that the electrode terminal of the cylindrical battery cell accommodated in the inner space is exposed to the outside, and
  a part of the reinforcing portion may be bent into the module housing through the connection opening.

In addition, the reinforcing portion may be bonded to at least one of a rim of the connection opening and a periphery of the connection opening.

Also, the second metal plate may include a reinforcing member configured to surround a connection region of the fuse portion and the second body portion.

Moreover, each of the first metal plate and the second metal plate may have a fixing hole perforated in an upper and lower direction, and the module housing may include a fixing protrusion inserted into the fixing hole to fix each of the first metal plate and the second metal plate, and a cushion member interposed between the fixing hole and the fixing protrusion.

In addition, the second metal plate may have a metal material with a greater specific resistance than the metal material of the first metal plate.

Also, the fuse portion may be bent at least once based on a direction extending from the second body portion, and the second contact portion may have at least two welding areas arranged in a direction perpendicular to the bending direction of the fuse portion based on a horizontal direction and welded to the electrode terminal.

In another aspect of the present disclosure, there is also provided a battery pack, comprising at least one battery module as above.

In another aspect of the present disclosure, there is also provided an electronic device, comprising the battery pack as above.

Advantageous Effects

According to an embodiment of the present disclosure, since the module bus bar of the present disclosure includes the first metal plate and the second metal plate located at the outer side of the first metal plate and having a smaller thickness than the first metal plate, it is possible to improve the durability of the module bus bar. That is, since the relatively thick first metal plate has relatively better rigidity against vibration or impact than the second metal plate, in the configuration where the first body portion of the first metal plate is disposed to face the outer surface of the module housing and the second body portion of the second metal plate having a smaller thickness is disposed at the outer side of the first body portion, it is possible to effectively reduce damage caused by the shock and continuous vibration of the module housing transmitted to the module bus bar.

Also, according to an embodiment of the present disclosure, if vibration or shock is transmitted to the connection region between the second contact portion and the fuse portion, the fuse portion is more highly likely to be cut due to its small width in comparison to other regions. Thus, since the second metal plate includes the reinforcing portion provided between the second contact portion and the fuse portion and having a greater width than the fuse portion, it is possible to reinforce mechanical rigidity between the second contact portion and the fuse portion. Therefore, it is possible to further increase the durability of the module bus bar against vibration or impact.

Moreover, according to an embodiment of the present disclosure, the fuse portion is bent at least once from the second body portion based on the direction in which the fuse portion extends, and at least two welding areas arranged in a direction perpendicular to the bending direction of the fuse portion based on the horizontal direction and welded to the electrode terminal are formed in the second contact portion. Thus, if the fuse portion is pulled by an external force, the bonded state may be effectively maintained by the strong bonding force of the at least two welding areas arranged in the perpendicular direction. Accordingly, the durability of the battery module may be effectively increased.

In addition, according to another embodiment of the present disclosure, since the fixing protrusion is inserted into the fixing hole to fix each of the first metal plate and the second metal plate and the cushion member is interposed between the fixing hole and the fixing protrusion, the cushion member may absorb vibrations or shocks transmitted from the module housing to the module bus bar, thereby effectively reducing the damage caused by frequent vibrations and shocks of the module bus bar.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
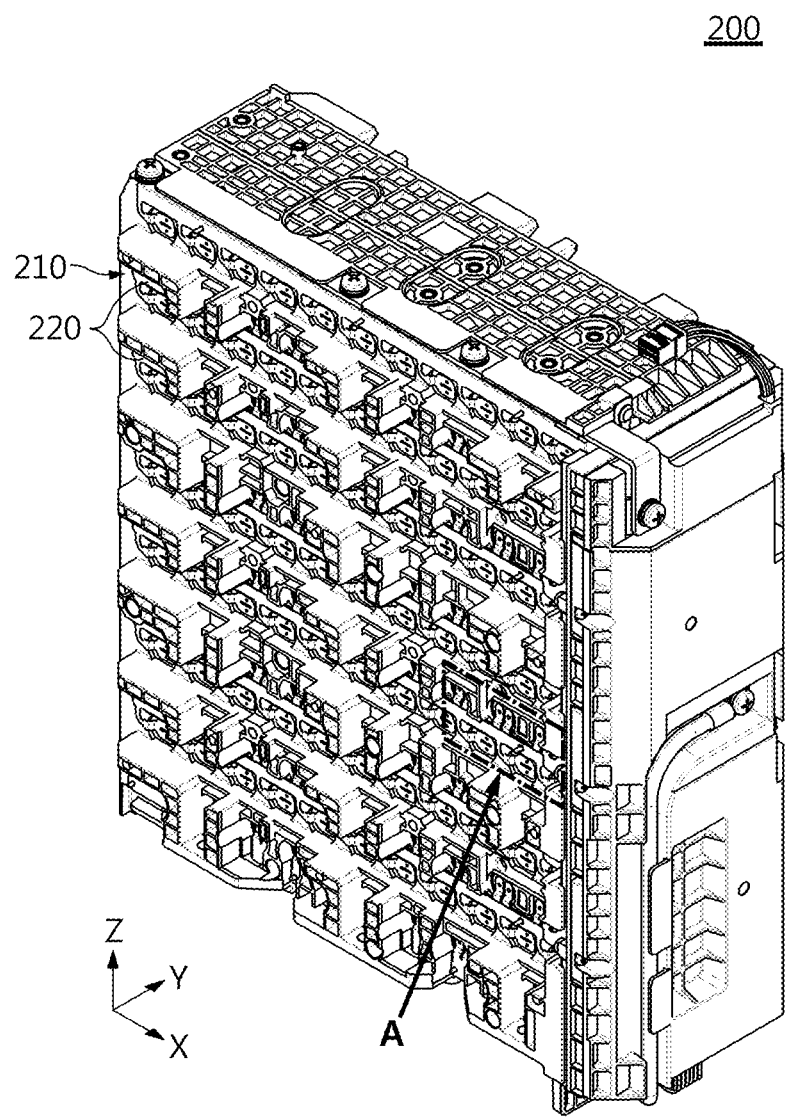
FIG. 1 is a perspective view schematically showing a battery module according to an embodiment of the present disclosure.
Figure 2:
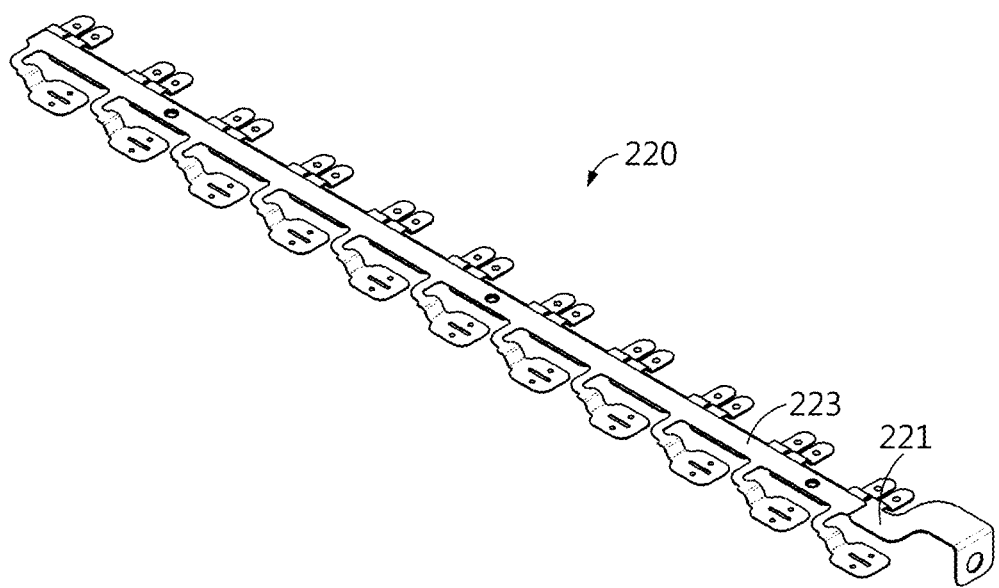
FIG. 2 is a perspective view schematically showing a module bus bar, which is a component of the battery module according to an embodiment of the present disclosure.
Figure 3:
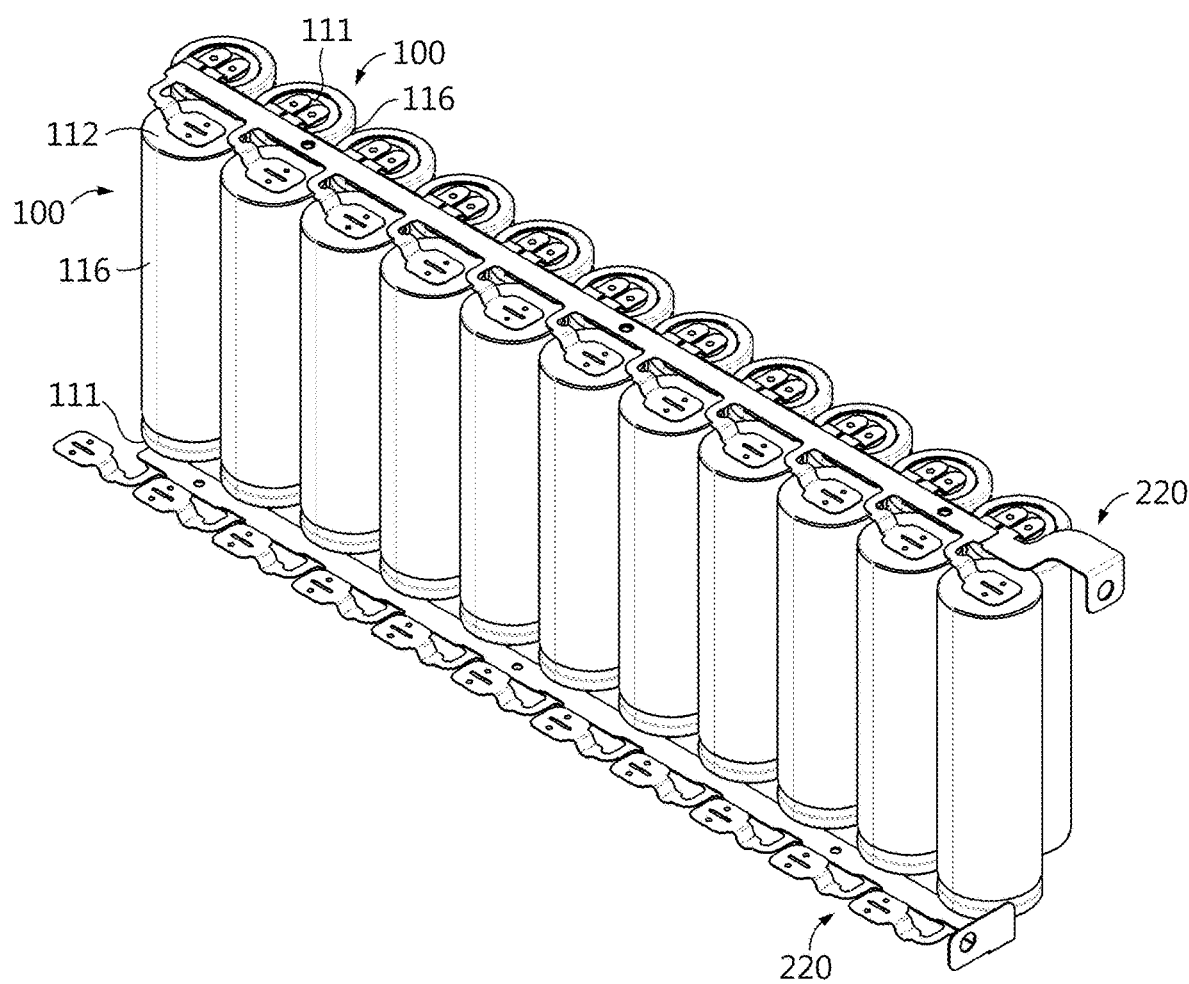
FIG. 3 is a perspective view schematically showing a plurality of cylindrical battery cells, which are components of the battery module according to an embodiment of the present disclosure.
Figure 4:
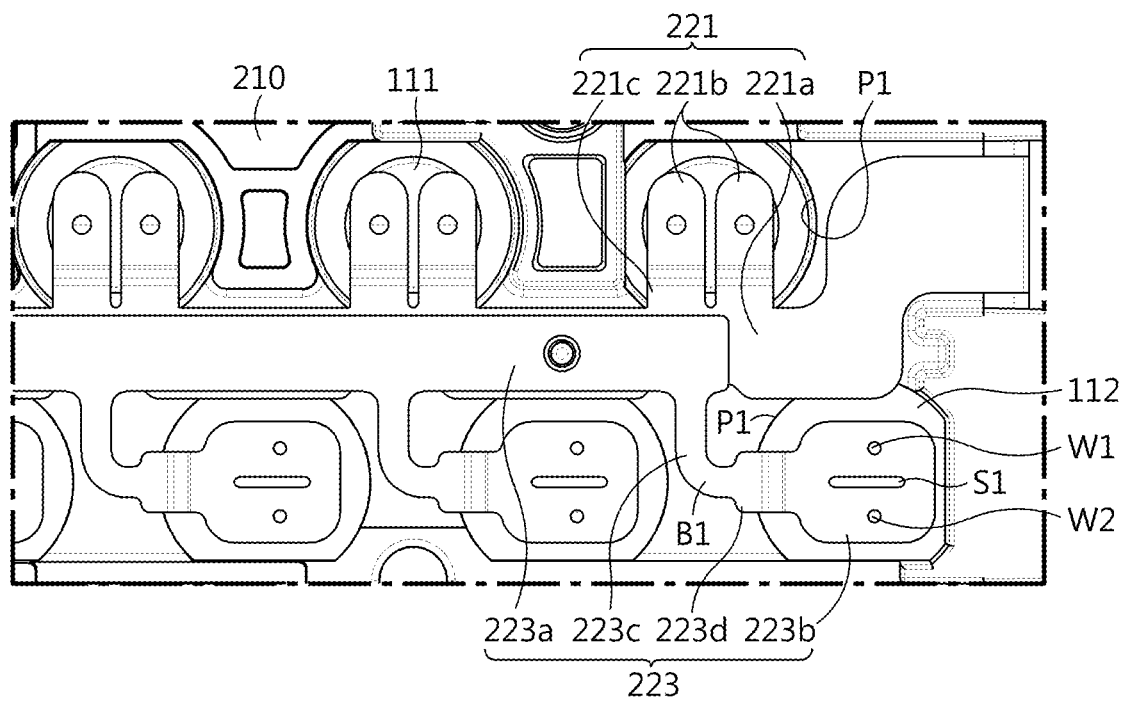
FIG. 4 is a partial front view schematically showing a portion A of FIG. 1 in an enlarged form.

FIG. 1 is a perspective view schematically showing a battery module according to an embodiment of the present disclosure. FIG. 2 is a perspective view schematically showing a module bus bar, which is a component of the battery module according to an embodiment of the present disclosure. FIG. 3 is a perspective view schematically showing a plurality of cylindrical battery cells, which are components of the battery module according to an embodiment of the present present disclosure. FIG. 4 is a partial front view schematically showing a portion A of FIG. 1 in an enlarged form.

Referring to FIGS. 1 to 4, a battery module 200 according to an embodiment of the present disclosure may include a plurality of cylindrical battery cells 100, a module housing 210, and a plurality of module bus bars 220.

Here, the cylindrical battery cell 100 may include a cylindrical battery can 116, and a battery assembly (not shown) accommodated in the battery can 116.

In addition, the battery can 116 includes a material with high electrical conductivity, and for example, the battery can 116 may include aluminum or copper.

Moreover, the battery can 116 may be configured to be laid long in a front and rear direction. In addition, the battery can 116 may have a cylindrical shape extending in an upper and lower direction. Moreover, electrode terminals 111, 112 may be formed at a front end portion and a rear end of the laid battery can 116.

Specifically, the electrode terminals may include a positive electrode terminal 111 and a negative electrode terminal 112. The positive electrode terminal 111 may be formed on a flat surface of a front end portion of the battery can 116, and the negative electrode terminal 112 may be formed on a flat circular rear surface of a rear end portion of the battery can 116. However, without being necessarily limited thereto, the positive electrode terminal 111 and the negative electrode terminal 112 may also be provided at the front end portion of the battery can.

At this time, the negative electrode terminal 112 may be located at a rim of the front end portion of the battery can 116, and the positive electrode terminal 111 may be located at the center of the front end portion. In addition, the positive electrode terminal 111 and the negative electrode terminal 112 formed at the front end portion may be insulated by a gasket that is an electrical insulator.

In addition, the arrangement of the cylindrical battery cell is not necessarily limited there, and conversely, the cylindrical battery cell 100 may be arranged such that the negative electrode terminal 112 is located at the front end portion and the positive electrode terminal 111 is located at the rear end portion.

Further, a plurality of cylindrical battery cells 100 may be arranged in a left and right direction and in an upper and lower direction. Since the configuration of the cylindrical battery cell 100 is widely known to those skilled in the art at the time of filing of this application, it will not be described in detail in this specification.

Meanwhile, the module housing 210 may have an inner space (not shown) in which the plurality of cylindrical battery cells 100 may be inserted and accommodated. Specifically, the inner space may have a plurality of hollow structures formed to surround an outer surface of the cylindrical battery cell 100. In this case, the module housing 210 may be made of an electrically insulating material. For example, the electrical insulating material may be a polymer plastic. More specifically, the electrical insulating material may be polyvinyl chloride.

In addition, the module bus bar 220 may be configured to electrically connect the plurality of cylindrical battery cells 100. The plurality of module bus bars 220 may be mounted to a front surface or a rear surface of the module housing 210.

Specifically, the module bus bar 220 may include a first metal plate 221 and a second metal plate 223. Specifically, the first metal plate 221 may include a first body portion 221a and a first contact portion 221b. The first body portion 221a may be located to face an outer surface of the module housing 210. The second metal plate 223 may be stacked on the first body portion 221a of the first metal plate 221.

For example, as shown in FIG. 1, the first body portion 221a may be a portion extending in the left and right direction along the outer surface of the module housing 210. In addition, the first contact portion 221b may be configured to contact the positive electrode terminal 111. That is, at least a part of the first contact portion 221b may be contacted or welded to the positive electrode terminal 111 so as to make an electrical connection with the positive electrode terminal 111.

In addition, the first metal plate 221 may include a connecting portion 221c that connects the first body portion 221a and the first contact portion 221b. The connecting portion 221c may have a structure bent inward through the connection opening P1 of the module housing 210.

Moreover, the second metal plate 223 may include a second body portion 223a, a second contact portion 223b, and a fuse portion 223c. The second body portion 223a may be stacked on an outer side of the first body portion 221a of the first metal plate 221. Here, the "outer side" may refer to as an outward direction based on the module housing 210. In other words, the "inner side" may refer to a direction toward the inner space of the module housing 210. The second body portion 223a may have a shape extending flat along the outer surface of the module housing 210. The second body portion 223a may be bonded to the first body portion 221a. The bonding may be performed, for example, by high-temperature compression or welding.

In addition, the second contact portion 223b may be configured to contact the electrode terminal 112. In this case, the electrode terminal 112 in contact with the second contact portion 223b may have an electrical polarity opposite to that of the electrode terminal 111 in contact with the first contact portion 221b. For example, the second contact portion 223b may contact the negative electrode terminal 112, and the first contact portion 221b may contact the positive electrode terminal 111. For example, if both the positive electrode terminal 111 and the negative electrode terminal 112 are provided at the front end portion of the cylindrical battery cell 100, when the fuse portion 223c, explained later, is disconnected, there is a risk that disconnected metal fragments of the fuse portion 223c may electrically connect the positive electrode terminal 111 and the negative electrode terminal 112. Therefore, it is preferable that the second contact portion 223b connected to the fuse portion 223c is in contact with the negative electrode terminal 112.

In addition, the fuse portion 223c may be shaped to electrically connect the second contact portion 223b and the second body portion 223a to each other. That is, one end of the fuse portion 223c may be electrically connected to the second contact portion 223b. The other end of the fuse portion 223c may be connected to the second body portion 223a. The fuse portion 223c may have a cross-sectional area set to be disconnected at a predetermined current or higher. For example, the fuse portion 223c may be configured such that at least a part of the fuse portion 223c is melted and disconnected by resistance heat when a current of 40 A to 60 A flows. The fuse portion 223c may have a cross-sectional area set in consideration of an allowable current range and a specific resistance of the metal material.

Further, the second metal plate 223 may have a smaller thickness than that of the first metal plate 221. For example, the thickness of the second metal plate 223 may have a ratio of 0.7 to 0.3 based on the first metal plate 221. Preferably, the second metal plate 223 may have a ratio of 0.5 based on the first metal plate 221. For example, the first metal plate 221 may have a thickness of 0.3 mm, and the second metal plate 223 may have a thickness of 0.15 mm.

Therefore, according to this configuration of the present disclosure, since the module bus bar 220 of the present disclosure includes the first metal plate 221 and the second metal plate 223 located at the outer side of the first metal plate 221 and having a smaller thickness than the first metal plate 221, it is possible to improve the durability of the module bus bar 220. That is, since the relatively thick first metal plate 221 has relatively better rigidity against vibration or impact than the second metal plate 223, in the configuration where the first body portion 221a of the first metal plate 221 is disposed to face the outer surface of the module housing 210 and the second body portion 223a of the second metal plate 223 having a smaller thickness is disposed at the outer side of the first body portion 221a, it is possible to effectively reduce damage caused by the shock and continuous vibration of the module housing 210 transmitted to the module bus bar 220.

Moreover, since the second metal plate 223 has a relatively small thickness, it is easy to apply the fuse portion 223c. That is, since the fuse portion 223c may easily have a small cross-sectional area when a thin metal plate is used, the fuse portion 223c may be disconnected in a predetermined current range with high reliability.

Referring back to FIG. 4, the second metal plate 223 may include a reinforcing portion 223d. The reinforcing portion 223d may be provided to reinforce mechanical rigidity of a connection region between the second contact portion 223b and the fuse portion 223c. The reinforcing portion 223d may be formed between the second contact portion 223b and the fuse portion 223c. The reinforcing portion 223d may have a greater width than that of the fuse portion 223c.

Therefore, according to this configuration of the present disclosure, if vibration or shock is transmitted to the connection region between the second contact portion 223b and the fuse portion 223c, the fuse portion 223c is more highly likely to be cut due to its small width in comparison to other regions. Thus, since the second metal plate 223 includes the reinforcing portion 223d provided between the second contact portion 223b and the fuse portion 223c and having a greater width than the fuse portion 223c, it is possible to reinforce mechanical rigidity between the second contact portion 223b and the fuse portion 223c. Therefore, it is possible to further increase the durability of the module bus bar 220 against vibration or impact.

Referring to FIGS. 1 and 4 again, the module housing 210 may have a connection opening P1 perforated so that the electrode terminal of the cylindrical battery cell 100 accommodated in the inner space is exposed to the outside. For example, as shown in FIG. 1, a plurality of connection openings P1 may be provided in each of the front surface and the rear surface of the module housing 210. The electrode terminals of the plurality of cylindrical battery cells 100 may be exposed to the outside through the plurality of connection openings P1.

In addition, a part of the reinforcing portion 223d may be bent into the module housing 210 through the connection opening P1. The second contact portion (223b) may extend from the bent end of the reinforcing portion 223d in an inner direction of the module housing 210. Here, the 'inner direction' refers to a direction in which the inner space of the module housing 210 is located.

Figure 5:
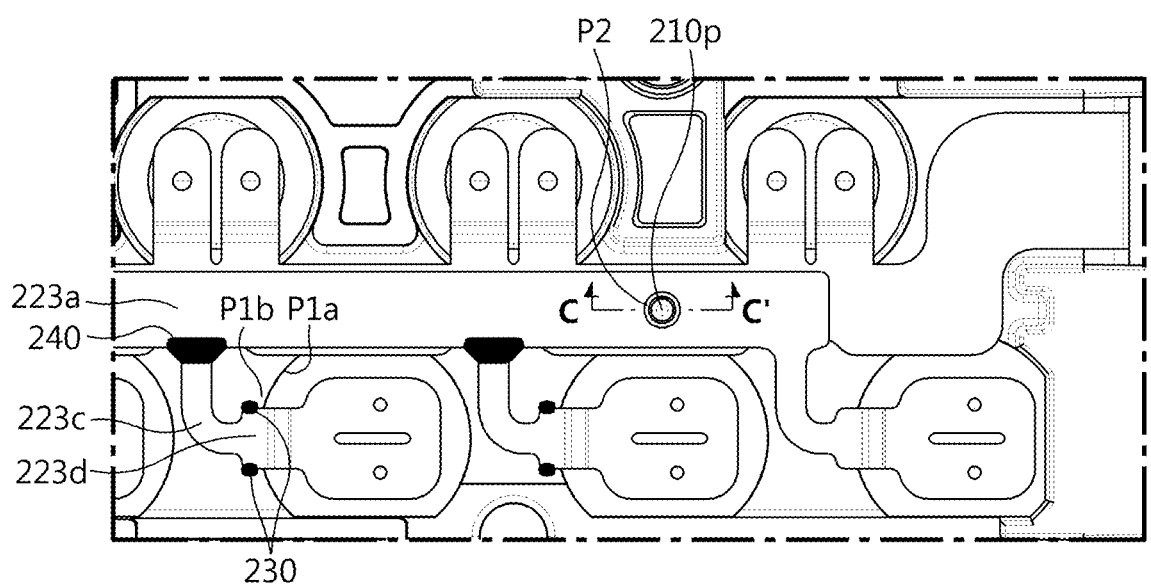
FIG. 5 is a partial front view schematically showing a module bus bar, which is a component of a battery module according to another embodiment of the present disclosure.

FIG. 5 is a partial front view schematically showing a module bus bar, which is a component of a battery module according to another embodiment of the present disclosure.

Referring to FIG. 5, the reinforcing portion 223d may be bonded to at least one of a rim P1a of the connection opening P1 and a periphery P1b of the connection opening P1. Here, the 'rim P1a of the connection opening P1' refers to an inner surface of the perforated connection opening P1 of the module housing 210. Also, the 'periphery P1b of the connection opening P1' refers to an outer surface of the module housing 210 in contact with the connection opening P1.

For example, as shown in FIG. 5, the reinforcing portion 223d may be located at the rim P1a of the connection opening P1 and the periphery P1b of the connection opening P1. At this time, an adhesive 230 may be applied between the reinforcing portion 223d and the rim P1a and the periphery P1b of the connection opening P1. The reinforcing portion 223d may be bonded to the rim P1a and the periphery P1b of the connection opening P1.

Therefore, according to this configuration of the present disclosure, since the reinforcing portion 223d is bonded to at least one of the rim P1a of the connection opening P1 and the periphery P1b of the connection opening P1, it is possible to prevent the module bus bar 220 from being damaged as the rim P1a and the periphery P1b of the connection opening P1 of the module housing 210 constantly collides with the reinforcing portion 223d. Moreover, by fixing the reinforcing portion 223d connected to the fuse portion 223c to the module housing 210, it is possible to prevent the fuse portion 223c from being cracked or losing mechanical rigidity as fatigue accumulates due to the continuous vibration of the module housing 210.

Referring to FIG. 5 again, the second metal plate 223 may include the reinforcing member 240 to supplement mechanical rigidity. The reinforcing member 240 may be configured to surround the connection region between the fuse portion 223c and the second body portion 223a. The reinforcing member 240 may be made of a polymer resin that is cured after application. The reinforcing member 240 may have an electrical insulating material.

For example, the electrical insulating material may be Teflon. The reinforcing member 240 may be applied in a molten state (a resin state) to the connection region between the fuse portion 223c and the second body portion 223a and then cured. Here, the curing may employ low-temperature curing, ultraviolet curing, or the like.

Therefore, according to this configuration of the present disclosure, since the second metal plate 223 includes the reinforcing member 240 configured to surround the connection region between the fuse portion 223c and the second body portion 223a, it is possible to effectively prevent the connection region between the fuse portion 223c and the second body portion 223a from being damaged due to vibration of the battery module 200 or external impact. That is, since the fuse portion 223c having a relatively small width is shaped to extend from the second body portion 223a, if continuous vibration occurs, the connection region between the fuse portion 223c and the second body portion 223a is more highly likely to be disconnected as vibration of the fuse portion 223c becomes more severe. Accordingly, in the present disclosure, the durability of the module bus bar 220 may be further increased by configuring the reinforcing member 240 to surround the connection region between the fuse portion 223c and the second body portion 223a.

Figure 6:
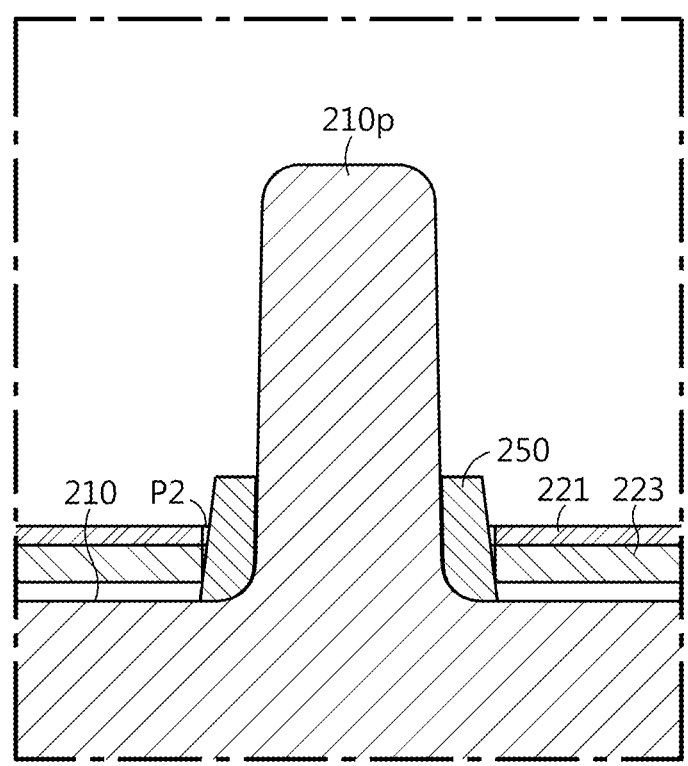
FIG. 6 is a partially sectioned view schematically showing a part of the battery module, taken along the line C-C' of FIG. 5.

FIG. 6 is a partially sectioned view schematically showing a part of the battery module, taken along the line C-C' of FIG. 5.

Referring to FIG. 6 again along with FIG. 5, each of the first metal plate 221 and the second metal plate 223 may have a fixing hole P2 perforated in an upper and lower direction. The fixing hole P2 formed in the first metal plate 221 may communicate with the fixing hole P2 formed in the second metal plate 223.

In addition, the module housing 210 may have a fixing protrusion 210$p$ configured to fix each of the first metal plate 221 and the second metal plate 223. The fixing protrusion 210$p$ may be configured to be inserted into the fixing hole P2. For example, as shown in FIG. 6, the fixing protrusion 210$p$ protruding on the module housing 210 outward may be inserted into the fixing hole P2 formed in the first metal plate 221 and the fixing hole P2 formed in the second metal plate 223.

Moreover, the module housing 210 may have a cushion member 250 interposed between the fixing hole P2 and the fixing protrusion 210$p$. The cushion member 250 may include a material with a predetermined elasticity. For example, the cushion member 250 may be made of a urethane material or a rubber material. The cushion member 250 may be configured to reduce the degree of transmission of vibrations generated in the module housing 210 to the first metal plate 221 and the second metal plate 223 of the module bus bar 220. The cushion member 250 may act to mitigate the shock transmitted to the module bus bar 220.

Thus, according to this configuration of the present disclosure, since the fixing protrusion 210$p$ is inserted into the fixing hole P2 to fix each of the first metal plate 221 and the second metal plate 223 and the cushion member 250 is interposed between the fixing hole P2 and the fixing protrusion 210$p$, the cushion member 250 may absorb vibrations or shocks transmitted from the module housing 210 to the module bus bar 220, thereby effectively reducing the damage caused by frequent vibrations and shocks of the module bus bar 220.

Referring to FIG. 4 again, the second metal plate 223 may have a metal material with a greater specific resistance than the metal material of the first metal plate 221. The second metal plate 223 may include, for example, nickel or a nickel alloy. In addition, the first metal plate 221 may include copper or a copper alloy.

Therefore, according to this configuration of the present disclosure, since the second metal plate 223 has a metal material with a greater specific resistance than the metal material of the first metal plate 221, the fuse portion 223$c$ provided to the second metal plate 223 may be disconnected reliably. That is, since the second metal plate 223 has a greater specific resistance than the first metal plate 221, when the same current flows, the temperature may rise relatively quickly, and thus the fuse portion 223$c$ provided to the second metal plate 223 may be melted and cut faster. Such quick disconnection may be effective in preventing fire or explosion of the battery module 200.

Referring to FIG. 4 again, the fuse portion 223$c$ may have a structure B1 that is bent at least once in a left direction or a right direction based on a direction extending from the second body portion 223$a$. The fuse portion 223$c$ may have a structure B1 bent to the left or right. This bent structure B1 makes it easy to increase the length of a current path of the fuse portion 223$c$ even in a narrow space.

In addition, at least two welding areas W1, W2 welded to the electrode terminal may be formed in the second contact portion 223$b$. At this time, a slit S1 may be formed between the at least two welding areas W1, W2. By means of the slit S1, it is possible to set a longer current path between the at least two welding areas W1, W2, thereby achieving efficient resistance welding between the second contact portion 223$b$ and the electrode terminal.

Moreover, the at least two welding areas W1, W2 of the second contact portion 223$b$ may be arranged in a direction perpendicular to the bending direction of the fuse portion 223$c$ based on a horizontal direction. For example, as shown in FIG. 4, the fuse portion 223$c$ may protrude upward from the second body portion 223$a$, and the protruding end thereof may be bent and extended in a right direction. In addition, the two welding areas W1, W2 arranged in an upper and lower direction and welded to the electrode terminal 112 may be formed in the second contact portion 223$b$.

Therefore, according to this configuration of the present disclosure, the fuse portion 223$b$ is bent at least once from the second body portion 223$a$ based on the direction in which the fuse portion 223$c$ extends, and at least two welding areas W1, W2 arranged in a direction perpendicular to the bending direction of the fuse portion 223$c$ based on the horizontal direction and welded to the electrode terminal are formed in the second contact portion 223$b$. Thus, if the fuse portion 223$c$ is pulled by an external force, the bonded state may be effectively maintained by the strong bonding force (tensile force) of the at least two welding areas W1, W2 arranged in the perpendicular direction. Accordingly, the durability of the battery module 200 may be effectively increased.

Meanwhile, a battery pack (not shown) according to an embodiment of the present disclosure may include at least one battery module 200. In addition, the battery pack may further include various devices (not shown) for controlling charging and discharging of the battery module 200, such as a BMS (Battery Management System), a current sensor, a fuse, and the like.

Meanwhile, an electronic device (not shown) according to an embodiment of the present disclosure includes at least one battery module 200 described above. The electronic device may further include a device housing (not shown) having an accommodation space for accommodating the battery module 200, and a display unit by which a user may check a state of charge of the battery module 200.

In addition, the battery pack according to an embodiment of the present disclosure may be included in a vehicle such as an electric vehicle or a hybrid electric vehicle. That is, the battery pack including at least one battery module 200 according to an embodiment of the present disclosure as described above may be mounted in a vehicle body of the vehicle according to an embodiment of the present disclosure.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Reference Signs

| | |
|---|---|
| 200: battery module | 220: module bus bar |
| 221: first metal plate | |
| 221a, 221b: first body portion, first | |

| Reference Signs | |
|---|---|
| contact portion | |
| 223: second metal plate | |
| 223a, 223b, 223c, 223d: second body portion, second contact portion, fuse portion, reinforcing portion | |
| 100: cylindrical battery cell | |
| 111, 112: positive electrode terminal, negative electrode terminal | |
| B1: bent structure | |
| 210: module housing | P1: connection opening |
| P1a, P1b: rim, periphery | 230: adhesive |
| 240: reinforcing member | P2: fixing hole |
| 210p: fixing protrusion | |
| 250: cushion member | W1, W2: welding area |

What is claimed is:

1. A battery module, comprising:
a plurality of cylindrical battery cells each vertically arranged, and each having a first electrode terminal and a second electrode terminal;
a module housing having an inner space to accommodate the plurality of cylindrical battery cells; and
a module bus bar configured to electrically connect the plurality of cylindrical battery cells to each other,
wherein the module bus bar includes:
a first metal plate having a first body portion facing an outer surface of the module housing and a first contact portion configured to contact a respective first electrode terminal; and
a second metal plate having a second body portion vertically stacked on an outer side of the first body portion of the first metal plate, a second contact portion configured to contact a respective second electrode terminal, and a fuse portion configured to electrically connect the second contact portion and the second body portion to each other and be disconnected at a predetermined current or above, the second metal plate having a smaller thickness than the first metal plate,
wherein the first metal plate has a first fixing hole, the second metal plate has a second fixing hole vertically aligned with the first fixing hole, and
wherein the module housing includes a fixing protrusion vertically extending through the first and second fixing holes to fix each of the first metal plate and the second metal plate, and a cushion member in the first and second fixing holes interposed between the fixing protrusion and the first and second metal plates.

2. The battery module according to claim 1, wherein the second metal plate includes a reinforcing portion between the second contact portion and the fuse portion and having a greater width than the fuse portion.

3. The battery module according to claim 2,
wherein the module housing includes a connection opening perforated so that the first and second electrode terminals of the cylindrical battery cells accommodated in the inner space are exposed to an outside of the module housing, and
a part of the reinforcing portion is bent into the module housing through the connection opening.

4. The battery module according to claim 3, wherein the reinforcing portion is bonded to at least one of a rim of the connection opening and a periphery of the connection opening.

5. The battery module according to claim 2, wherein the second metal plate includes a reinforcing member surrounding a connection region of the fuse portion and the second body portion.

6. The battery module according to claim 1,
wherein the second metal plate has a metal material having a greater specific resistance than a greater specific resistance of a metal material of the first metal plate.

7. The battery module according to claim 1, wherein the fuse portion is bent at least once based on a direction extending from the second body portion, and
wherein the second contact portion has at least two welding areas disposed in a direction perpendicular to a bending direction of the fuse portion based on a horizontal direction and welded to the respective second electrode terminal.

8. A battery pack, comprising at least one battery module according to claim 1.

9. An electronic device, comprising the battery pack according to claim 8.

* * * * *